United States Patent

Schwarz et al.

[11] Patent Number: 6,162,039
[45] Date of Patent: Dec. 19, 2000

[54] APPARATUS AND METHOD FOR SHAPING AND DISPENSING PUREED FOOD

[75] Inventors: Cindi Schwarz, Gurnee, Ill.; Barbara Lescher, Springfield, Ky.; Beverly Guyser, Elk Grove Village, Ill.

[73] Assignee: Better Way Innovations, Inc., Elk Grove, Ill.

[21] Appl. No.: 09/178,254

[22] Filed: Oct. 23, 1998

[51] Int. Cl.[7] .................................................. B29C 33/44
[52] U.S. Cl. .......................... 425/282; 425/286; 426/389; 426/512
[58] Field of Search ..................... 425/282, 284, 425/286, 187, 276, DIG. 57; 426/512, 389

[56] References Cited

U.S. PATENT DOCUMENTS

| | | |
|---|---|---|
| 510,286 | 12/1893 | Osterman . |
| 671,788 | 4/1901 | Bach . |
| 1,380,757 | 6/1921 | Van Sant . |
| 1,606,923 | 7/1926 | Christensen ............................ 425/286 |
| 1,642,726 | 9/1927 | Gardner ................................. 425/286 |
| 1,798,490 | 3/1931 | Parr . |
| 1,892,779 | 1/1933 | Cole . |
| 1,921,535 | 8/1933 | McLean et al. . |
| 2,118,976 | 5/1938 | Larkin . |
| 2,435,805 | 2/1948 | Tanner . |
| 2,503,064 | 4/1950 | Peterson . |
| 2,660,784 | 12/1953 | Greene . |
| 2,669,194 | 2/1954 | Brown ..................................... 425/286 |
| 4,106,197 | 8/1978 | Russell ................................... 425/276 |
| 4,161,381 | 7/1979 | Sciortino ................................ 425/286 |
| 4,546,545 | 10/1985 | Hirano ...................................... 30/128 |
| 4,699,582 | 10/1987 | Chen ...................................... 425/286 |
| 4,721,449 | 1/1988 | Alberts ................................... 425/286 |
| 4,729,589 | 3/1988 | Puskar .................................... 425/286 |
| 4,859,168 | 8/1989 | Calder .................................... 425/284 |
| 5,303,473 | 4/1994 | Sadler ..................................... 425/299 |

*Primary Examiner*—Harold Pyon
*Assistant Examiner*—Thukhanh T. Nguyen
*Attorney, Agent, or Firm*—Baniak Nicholas Pine & Gannon

[57] ABSTRACT

An apparatus for shaping and dispensing pureed food is provided. A mold includes a back wall having an opening formed therein. A handle is attached to the mold and a lever is pivotally attached to the handle. A plate is disposed within the mold and has a shape substantially conforming to the back wall. A bracket member extends through the opening formed in the back wall of the mold and includes a first end portion attached to a back side of the plate and a second end portion attached to the lever.

17 Claims, 4 Drawing Sheets

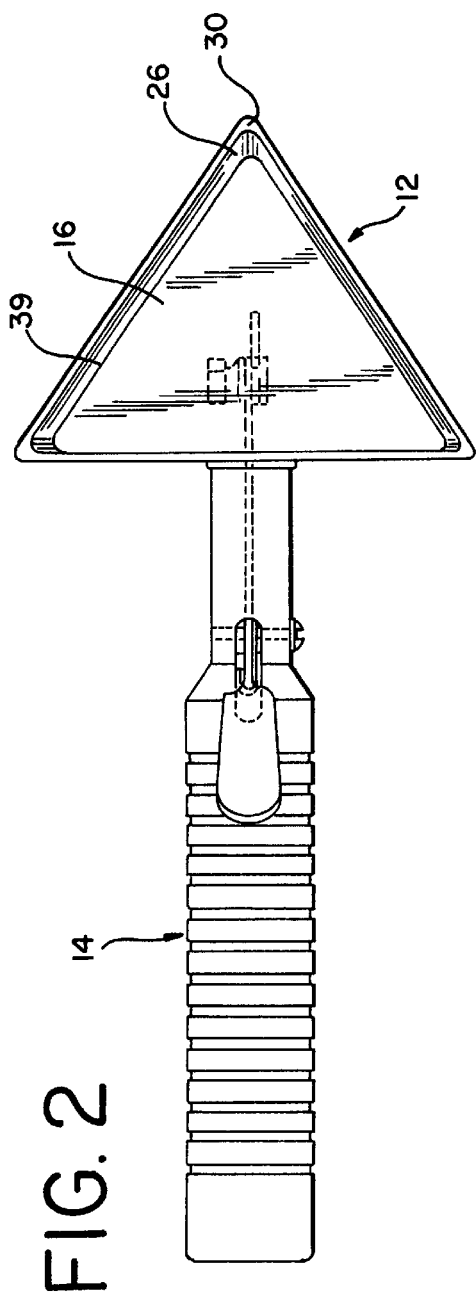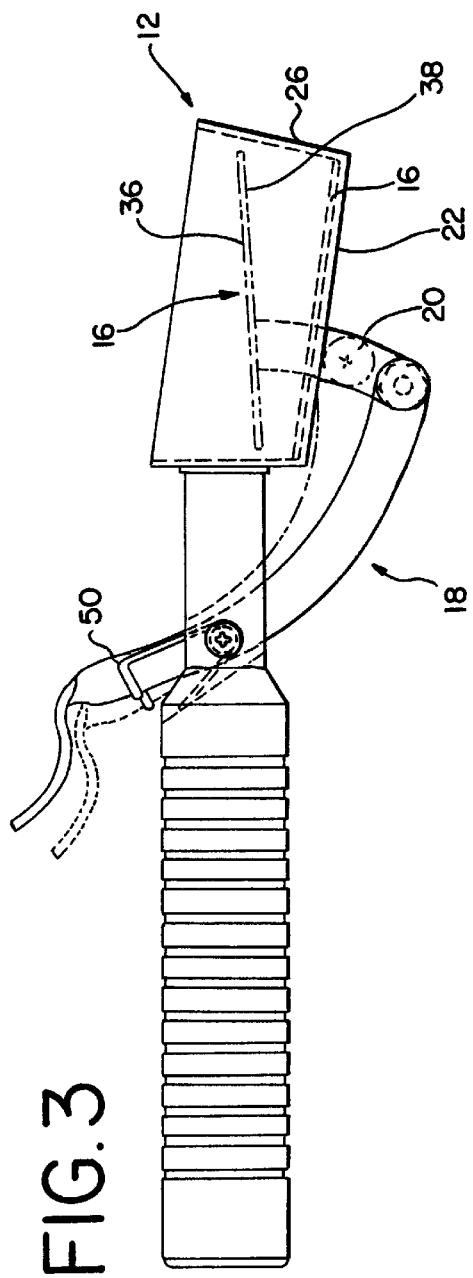

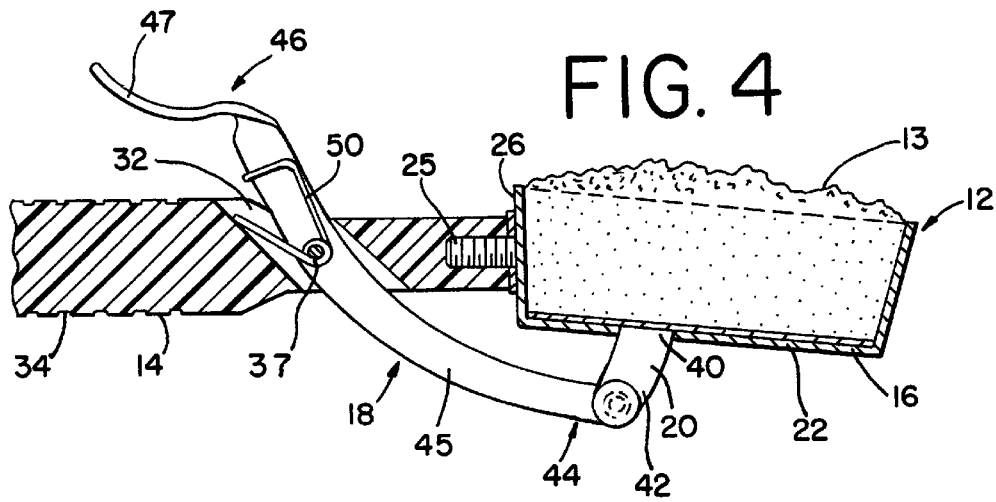
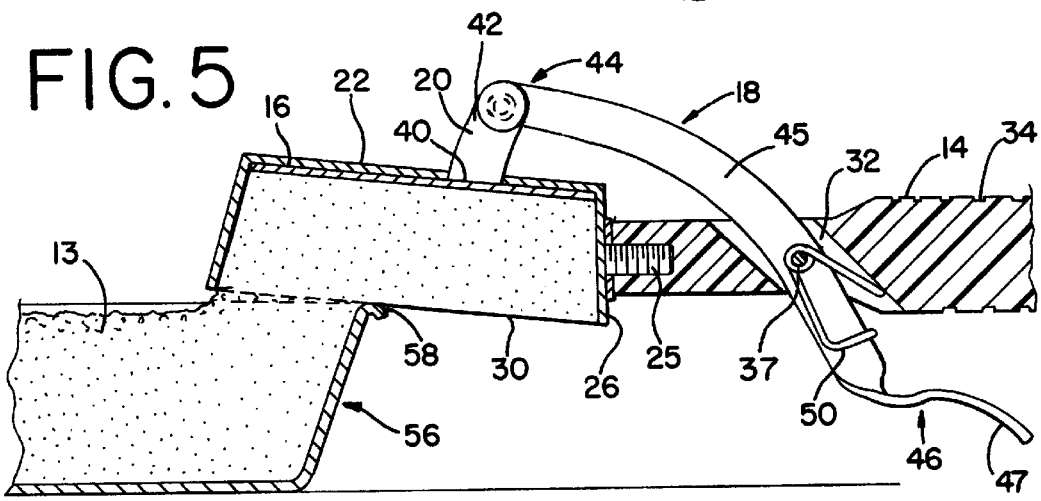
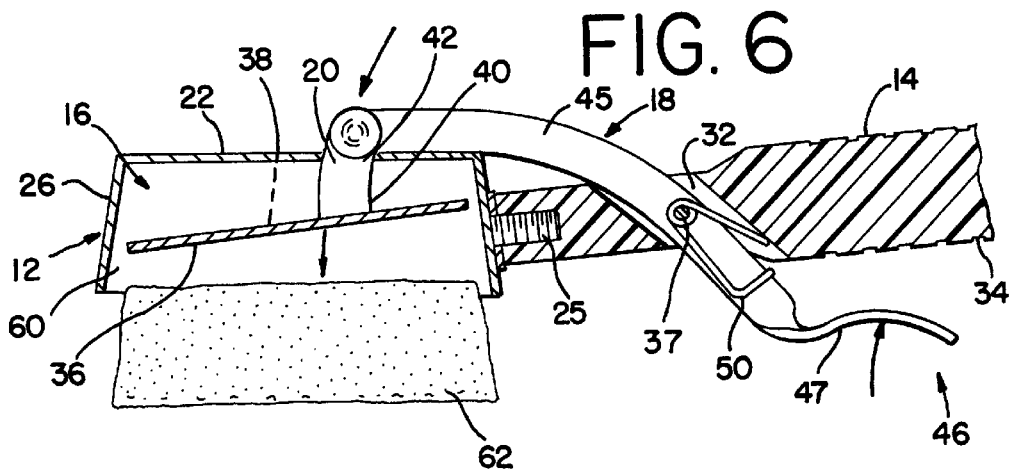

APPARATUS AND METHOD FOR SHAPING AND DISPENSING PUREED FOOD

FIELD OF THE INVENTION

This invention relates generally to the field of food handling products and, in particular, to an apparatus and method for shaping pureed food in a mold and thereafter dispensing the shaped pureed food from the mold.

BACKGROUND OF THE INVENTION

Hospitals, nursing homes, and other institutions in the food service industry typically serve various types of pureed foods. In general, pureed foods are food products that have a soft texture and require little or no chewing and can be easily swallowed. Conventional ice cream scoops have been used to serve these types of pureed food products. Ice cream scoops typically have a curved bowl section and a curved blade that travels along the inner surface of the bowl section to release the pureed food. Although conventional ice cream scoops have proven to be acceptable to dispense the pureed food from the bowl section, a major drawback is that each type of food that is served has the same spherical shape, which is oftentimes unattractive and unappealing to the patient or consumer.

Conventional molds have been used to allow pureed food products to be formed in various shapes to enhance the appearance of the food. However, the process of preparing such food products with conventional molds is both costly and labor intensive. For example, a separate mold must be provided. A separate utensil is typically required to transfer the pureed food from a food container into the mold. Another utensil may be required to remove the excess pureed food from the mold to create the desired shape. Since there is typically no way to remove pureed food that is at or near room temperature from the mold, the mold is typically placed in a freezer. Once frozen, the pureed food may then be removed from the mold with yet another utensil. Once the frozen food is removed from the mold, it must then be re-heated to a suitable temperature for consumption.

Accordingly, it would be desirable to have a convenient and cost effective apparatus and method for shaping and dispensing pureed food that overcomes the disadvantages described above.

SUMMARY OF THE INVENTION

One aspect of the invention provides an apparatus for shaping and dispensing pureed food. A mold includes a back wall having an opening formed therein. A handle is attached to the mold, and a lever is pivotally attached to the handle. A plate is disposed within the mold and has a shape substantially conforming to the shape of the back wall. A bracket member extends through the opening formed in the back wall of the mold. The bracket member includes a first end portion attached to a back side of the plate and a second end portion attached to the lever. The second end potion of the bracket member may preferably be removably attached to a first end portion of the lever. The handle may preferably include an opening formed therein that is configured to allow a pivoting action of the lever, which extends through the opening. The opening may preferably be angled 60 degrees from vertical. A pin may preferably extend through the lever and handle and the lever may preferably be rotatable about the pin. A spring may preferably contact the lever and the handle to bias the plate toward the back wall of the mold. The lever may preferably include a second end portion having a manually operable portion and a curved body portion. The mold may preferably include a plurality of side walls extending from the back wall and tapered outward from the back wall. The plurality of side walls may preferably be angled outward 10 degrees from vertical. The back wall and the plate each may have a triangular shape. Alternatively, the back wall and the plate each may have a square shape or a rectangular shape. The mold, plate, and lever each may preferably be comprised of stainless steel. The handle may preferably include a plurality of spaced-apart grooves and may be comprised of rigid plastic.

Another aspect of the invention provides a method of shaping and dispensing purees food. A mold including a back wall and an opening formed therein is provided. A handle is attached to the mold and a lever is pivotally attached to the handle. A plate is disposed within the mold and has a shape substantially conforming to the shape of the back wall. A bracket member extends through the opening formed in the back wall of the mold. The bracket member includes a first end portion attached to a back side of the plate and a second end portion attached to the lever. The mold is filled with pureed food. The lever is rotated and the plate is moved in a direction away from the back wall of the mold. The pureed food having a shape conforming to a shape of the mold is ejected from the mold. The plate may preferably be biased toward the back wall. Back pressure may be relieved by providing a gap between an outer perimeter edge of the plate and the plurality of side walls. The mold may also include a perimeter edge. The mold may preferably be passed through pureed food contained in a food container to fill the mold with the pureed food. The perimeter edge may preferably be slid across an edge of the food container to remove excess pureed food from the mold.

Another aspect of the invention provides an apparatus for shaping and dispensing pureed food. A mold includes a back planar wall and a plurality of side walls extending from the back wall. The back wall includes an opening formed therein. A handle is attached to the mold and includes an opening formed therein. A lever extends through the opening in the handle and is rotatably attached to a pin positioned across the opening of the handle. A bracket member extends through the opening in the back wall of the mold. A plate is disposed within the mold and includes a back portion attached to a first end portion of the bracket. A second end portion of the bracket is releasably attached to the lever. The plate is biased toward the back wall and has a shape substantially conforming to the shape of the back wall. The plurality of side walls are tapered outward from the back wall to provide a gap between an outer perimeter edge of the plate and the plurality of side walls as the lever is pivoted about the pin and the plate is moved in a direction away from the back wall.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

BRIEF DESCRIPTION OF THE DRAWINGS

FIG. 2 is a plan view of the embodiment of FIG. 1;

FIG. 3 is a side view of the embodiment of FIG. 2;

FIG. 4 is a sectional view of the embodiment of FIG. 3 showing the mold filled with pureed food;

FIG. 5 is an inverted view of the embodiment of FIG. 4 showing excess pureed food being removed from the mold;

FIG. 6 is a view of the embodiment of FIG. 5 showing the shaped pureed food being ejected from the mold;

DETAILED DESCRIPTION OF THE PRESENTLY PREFERRED EMBODIMENTS

Figure 1:
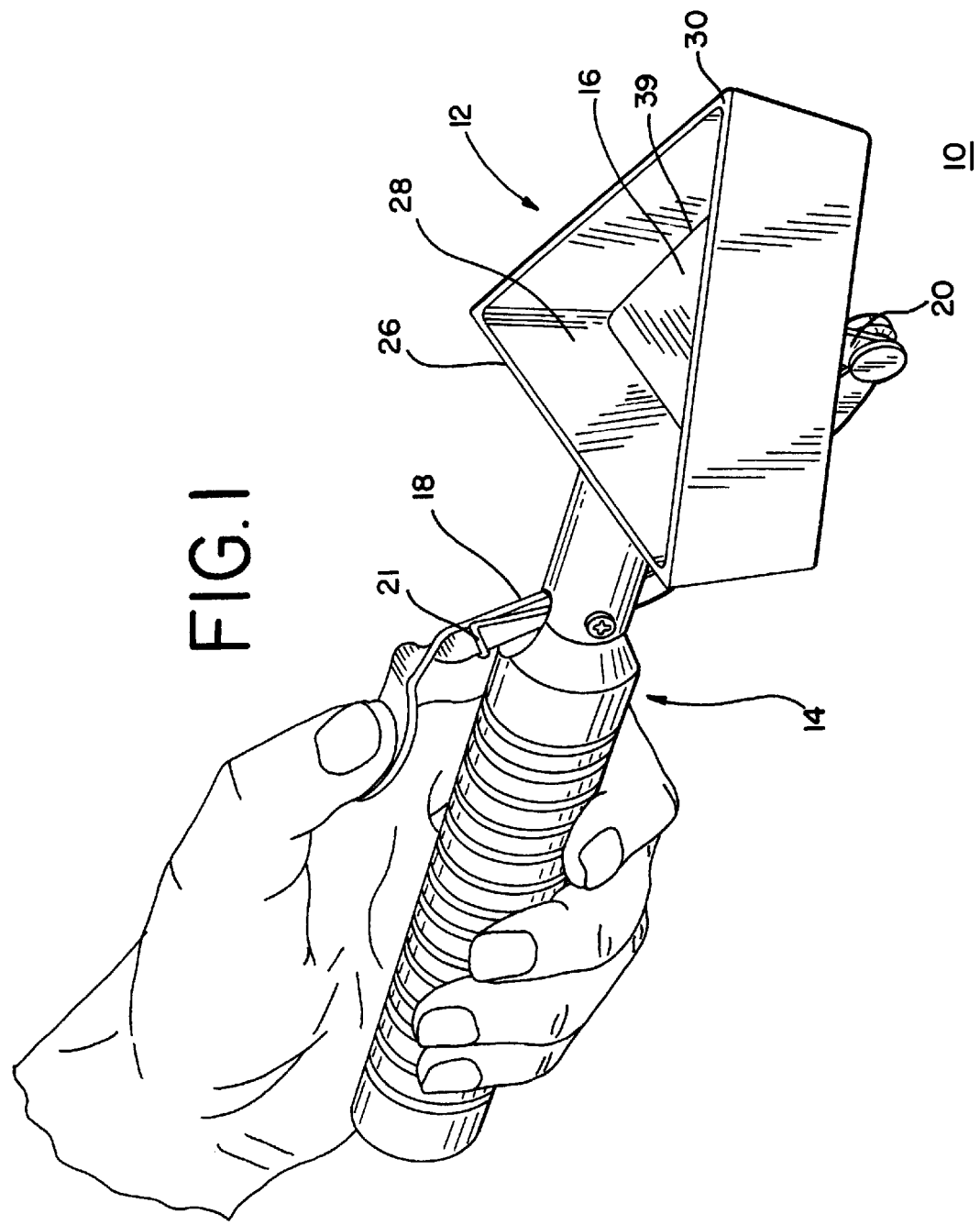
FIG. 1 is a perspective view of a preferred embodiment of an apparatus for shaping and dispensing pureed foods which is made in accordance with the invention.

As shown in FIGS. 1–7, a preferred embodiment of an apparatus 10 for shaping and dispensing pureed food includes a mold 12, a handle 14, a plate 16, a lever 18, a bracket member 20, and a spring 21. The apparatus 10 can be used by a food server to shape pureed food in the mold 12 and thereafter eject the shaped pureed food from the mold 12.

Figure 7:
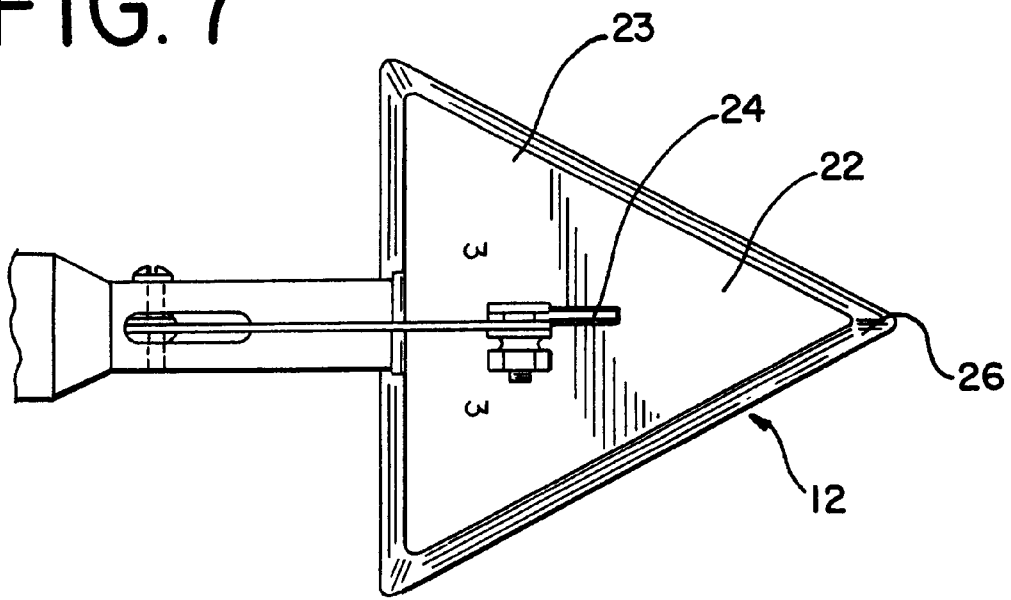
FIG. 7 is a partial back view of the embodiment of FIG. 2.

As shown in FIG. 4, the mold 12 may be filled with various types of pureed food. As shown in FIGS. 3–7, the mold 12 includes a planar back wall 22 having an opening 24 (see FIG. 7) formed therein. In the embodiment shown, the back wall 22 has a triangular shape, although other shapes are contemplated depending upon the shape of the mold 12 desired. As shown in FIG. 7, the opening 24 in the back wall 22 may preferably be a slot that is located in the center of the back wall 22, although various configurations of the opening 24 are contemplated. Reference numerals 23 may preferably be inscribed into the back wall 22 of the mold 16 to indicate to a user the volume or weight of the food product that can be contained in the mold 12. As shown in FIGS. 14, the mold 12 may preferably include a plurality of side walls 26 extending from the back wall 22 and defining a cavity 28. As shown in FIGS. 2–7, the plurality of side walls 26 may preferably be tapered outward from the back wall 22. In the embodiment shown, for example, the plurality of side walls 26 are tapered outward 10 degrees from vertical. As shown in FIGS. 1–2, a perimeter edge 30 extends around the perimeter of the mold 12. The mold 12 may preferably be comprised of any rigid material suitable including, for example, stainless steel or molded plastic. The material may preferably be dishwasher safe and NSF (National Sanitation Foundation) approved. In the embodiment shown in FIGS. 1–7, the mold 12 includes three side walls 26 that form a triangular shaped mold 12. However, the number and configuration of the side walls 26 may vary depending on the shape of the mold 12 desired.

As shown in FIGS. 1–7, the handle 14 is attached to the mold 12. The handle 14 allows a user to manipulate the apparatus 10 during use. The handle 14 may preferably be attached to the mold 12 in any conventional manner. For example, as shown in FIGS. 4–6, the handle 14 may include a threaded insert located adjacent the attachment end of the handle 14 that receives a conventional fastener 25 such as, for example, a screw or a bolt mounted to one of the side walls 26. Alternatively, the handle 14 may be removably attached to the mold 12 with a conventional pin release arrangement. The handle 14 includes an opening 32 that extends through the handle 14. The opening 32 in the handle 14 is configured to allow the lever 18 to have a pivoting action. In the embodiment shown, the opening 32 is angled 60 degrees from vertical, although other angles may be sufficient depending upon the particular application. The handle 14 may preferably includes a plurality of spaced-apart grooves 34 formed therein to facilitate the gripping of the handle 14 by the user. In the embodiment shown, the grooves 34 extend horizontally around the entire circumference of the handle 14. The placement and orientation of the grooves 34 may vary depending upon the particular application. For example, the grooves 34 may be spaced-apart and extend vertically along the length of the handle 14. The handle 14 may preferably be comprised of any lightweight rigid material such as, for example, molded plastic. The material may preferably be dishwasher safe and NSF approved.

As shown in FIGS. 1–6, the plate 16 is a generally planar member that includes a front side 36 and a back side 38 and a perimeter edge 39. The plate 16 is disposed within the cavity 28 of the mold 12. The function of the plate 16 is to eject pureed food from the mold 12. The plate 16 has a shape that substantially conforms to the shape of the back wall 22. This allows the pureed food that has been shaped in the mold 12 to be ejected from the mold 12 in the desired shape. In the embodiment shown, the plate 16 and the back wall 22 both have a triangular shape. The shape of the plate 16 and the back wall 22 may vary depending upon the shape of the mold 12 desired. For example, the plate 16 and the back wall 22 each may have a rectangular shape, a square shape, a round shape, or an oval shape. The plate 16 may preferably be comprised of any rigid material such as, for example, stainless steel or molded plastic. The material may preferably be dishwasher safe and NSF approved.

As shown in FIGS. 3–6, the bracket member 20 includes a first end portion 40 and a second end portion 42. The bracket member 20 extends through the opening 24 in the back wall 22 of the mold 12. The bracket member 20 provides a mechanical connection between the plate 16 and the lever 18. In particular, the first end portion 40 of the bracket member 20 is attached to the back side 38 of the plate 16. The first end portion 40 may preferably be attached to the back side 38 of the plate 16 in any conventional manner. For example, the first end portion 40 may preferably be welded to the plate 16. The bracket member 20 may preferably be comprised of any rigid material including, for example, stainless steel or molded plastic. The material may preferably be dishwasher safe and NSF approved.

As shown in FIGS. 3–6, the lever 18 includes a first end portion 44, a body portion 45, and a second end portion 46. The lever 18 extends through the opening 32 in the handle 14 and is pivotally attached to the handle 14. In particular, the lever 18 is rotatable about pin 37 that extends through the handle 14, across the opening 32 in the handle 14, and through an opening (not shown) in the body portion 45 of the lever 18. In the embodiment shown, for example, the pin 37 is a screw, although other conventional components such as bolts may be utilized. The first end portion 44 of the lever 18 is removably attached to the second end portion 42 of the bracket member 20 with conventional fasteners such as, for example, screws or bolts. Alternatively, the first end portion 44 of the lever 18 may preferably be removably attached to the second end portion 42 with a conventional pin release arrangement. The advantage of this arrangement is that the plate 12 and associated bracket member 20 may be easily disconnected from the lever 18 to allow the plate 12 and bracket member 20 to be removed from the mold 12 for cleaning purposes. The second end portion 46 of the lever 18 includes a manually operable portion 47 to allow a user to rotate the lever 18 about the pin 37. In the embodiment shown, the body portion 45 of the lever 18 may preferably be curved to facilitate the operation of the lever 18. The lever 18 may preferably be comprised of any rigid material including, for example, stainless steel or molded plastic. The material may preferably be dishwasher safe and NSF approved.

As shown in FIGS. 3–6, a spring 50 may preferably be in contact with the handle 14 and the lever 18 to bias the plate 16 toward the back wall 22 of the mold 12. In particular, the biasing of the plate 16 causes the back side 38 of the plate 16 to be in contact with the back wall 22 of the mold 12. FIG. 3 shows the position of the lever 18 in solid lines when the plate 16 is biased against the back wall 22 of the mold 12. The phantom lines show the position of the lever 18 and the plate 16 when the lever 18 is rotated to cause the plate 16 to move away from the back wall 22 of the mold 12. The spring 50 may be comprised of any suitable material including, for example, stainless steel wire. The material may preferably be dishwasher safe and NSF approved. Moreover, various configurations of the spring 50 are contemplated.

Figure 8:
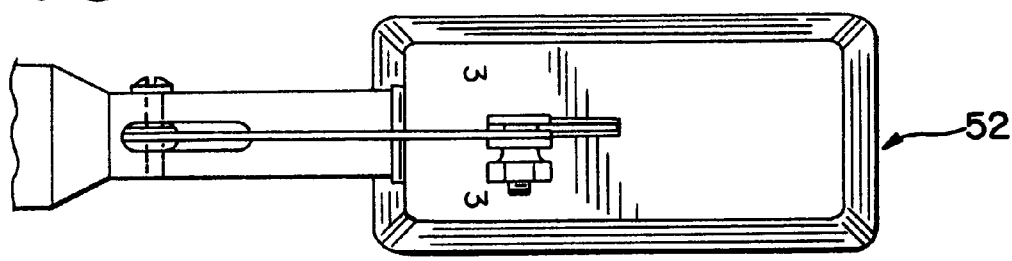
FIG. 8 is a partial back view of an alternative embodiment of an apparatus for shaping and dispensing pureed foods showing a mold having a rectangular shape.
Figure 9:
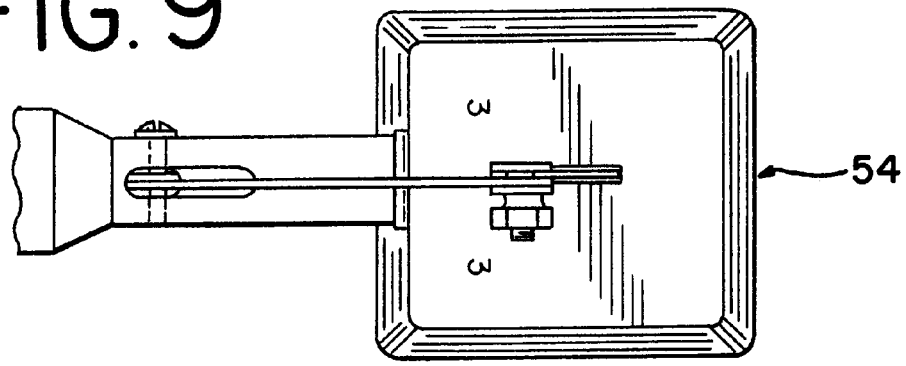
FIG. 9 is a partial back view of an alternative embodiment of an apparatus for shaping and dispensing pureed foods showing a mold having a square shape.

FIG. 8 shows an alternative embodiment of a mold 52 having a rectangular shape. In this embodiment, the back wall of the mold 52 and the plate (not shown) each have a rectangular shape. FIG. 9 shows an alternative embodiment of a mold 54 having a square shape. In this embodiment, the back wall of the mold 54 and the plate (not shown) each have a square shape. The wide range of shapes of molds that may be used provides greater flexibility when preparing various types of pureed food product and allows the foods to be presented in different shapes which is more attractive and appealing to the patient or consumer. It is contemplated that other shapes of the mold may be utilized without departing from the spirit of the present invention.

As shown in FIGS. 1 and 4–6, a user may grasp the handle 14 and pass the mold 12 through pureed food 13 contained in a food container 56 to fill the mold 12 with the pureed food 13. As shown in FIG. 5, to remove excess pureed food from the mold 12, the user may slide the entire perimeter edge 30 of the mold 12 across an edge 58 of the food container 56 or any other suitable structure. As shown in FIG. 6, the manually operable portion 47 of the lever 18 may be pushed in the direction toward the handle 14, which causes the rotation of the lever 18 about the pin 37. This in turn causes the bracket member 20 to move the plate 16 in a direction away from the back wall 22 of the mold 12. Because the plurality of side walls 26 are tapered outward from the back wall 22, a gap 60 is provided between the outer perimeter 39 of the plate 16 and the side walls 26 as the plate 16 is moved in a direction away from the back wall 22. The gap 60 relieves any backpressure that may exist in the mold 12 to facilitate the removal of the pureed food. As shown in FIG. 6, when the lever 18 is fully rotated, the shaped pureed food 62 having the shape that conforms to the shape of the mold 12 is ejected from the mold 12. As a result, the apparatus 10 provides a convenient and cost effective way to shape and dispense pureed foods without the added expense and labor involved with conventional molds.

It is contemplated that the apparatus 10 may be used to shape and dispense any type of pureed food products. Pureed food products are defined herein as any type of food product having a consistency that may be shaped or molded.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. An apparatus for shaping and dispensing pureed food comprising:
a mold including a back wall, the back wall including an opening formed therein, a handle attached to the mold, a lever pivotally attached to the handle, a plate disposed within the mold and having a shape substantially conforming to the back wall, a bracket member extending through the opening formed in the back wall of the mold, the bracket member including a first end portion attached to a back side of the plate and a second end portion attached to the lever wherein the handle includes an opening formed therein, the opening is angled about 60 degrees from vertical, the lever extending through the opening wherein the opening in the handle is configured to allow a pivoting action of the lever.

2. The apparatus of claim 1 wherein the second end portion of the bracket member is removably attached to a first end portion of the lever.

3. The apparatus of claim 1 wherein the opening is angled 60 degrees from vertical.

4. The apparatus of claim 1 further comprising a pin extending through the lever and the handle, the lever rotatable about the pin.

5. The apparatus of claim 1 further comprising a spring contacting the lever and the handle to bias the plate toward the back wall of the mold.

6. The apparatus of claim 1 wherein the lever includes a second end portion have a manually operable portion.

7. The apparatus of claim 1 wherein the lever includes a curved body portion.

8. The apparatus of claim 1 wherein the lever is comprised of stainless steel.

9. The apparatus of claim 1 wherein the mold includes a plurality of side walls extending from the back wall and tapered outward from the back wall.

10. The apparatus of claim 9 wherein the plurality of side walls are angled outward 10 degrees from vertical.

11. The apparatus of claim 1 wherein the mold is comprised of stainless steel.

12. The apparatus of claim 1 wherein the back wall and the plate each have a triangular shape.

13. The apparatus of claim 1 wherein the back wall and the plate each have a square shape.

14. The apparatus of claim 1 wherein the back wall and the plate each have a rectangular shape.

15. The apparatus of claim 1 wherein the plate is comprised of stainless steel.

16. The apparatus of claim 1 wherein the handle includes a plurality of spaced-apart grooves.

17. The apparatus of claim 1 wherein the handle is comprised of rigid plastic.

* * * * *